United States Patent [19]

Rose

[11] Patent Number: 5,109,985
[45] Date of Patent: May 5, 1992

[54] END CAP LOCKING MEANS FOR A PALLETIZED CONTAINER

[75] Inventor: Henry H. Rose, Knoxville, Tenn.

[73] Assignee: Formall/Blackwood Corporation, Knoxville, Tenn.

[21] Appl. No.: 712,089

[22] Filed: Jun. 7, 1991

[51] Int. Cl.$^5$ .............................................. B65D 19/06
[52] U.S. Cl. ..................................... 206/600; 108/55.1
[58] Field of Search ............... 206/600; 108/56.1, 55.1

[56] References Cited

U.S. PATENT DOCUMENTS

| | | | |
|---|---|---|---|
| 1,690,853 | 11/1928 | Behrman . | |
| 3,443,737 | 5/1969 | Kupersmit . | |
| 3,770,186 | 11/1973 | Kupersmit . | |
| 4,550,830 | 11/1985 | Shuert . | |
| 4,765,252 | 8/1988 | Shuert | 206/600 X |
| 4,936,451 | 6/1990 | Shuert | 206/600 X |
| 5,029,734 | 7/1991 | Nichols | 206/600 X |

Primary Examiner—William I. Price
Attorney, Agent, or Firm—Luedeka, Hodges, Neely & Graham

[57] ABSTRACT

A palletized container includes a member defining sidewalls for the container, at least one reusable end cap for attachment to the sidewalls as the end cap receives an end of the sidewall-defining member, and a locking system for locking the sidewall-defining member to the end cap. The sidewall-defining member includes a notch adjacent one of its ends, and the locking system includes a slide bar slidably retained within the notch for movement between an advanced position and a retracted position. The end cap includes an outermost wall positionable outside of a sidewall when the sidewall-defining member is received by the end cap, and the outermost wall includes a slotted boss protruding generally inwardly of the outermost wall. When the sidewall-defining member is received by the end cap, the slots in the boss accept the slide bar when it is moved from its retracted position toward its advanced position to thereby lock the sidewall-defining member to the end cap.

20 Claims, 6 Drawing Sheets

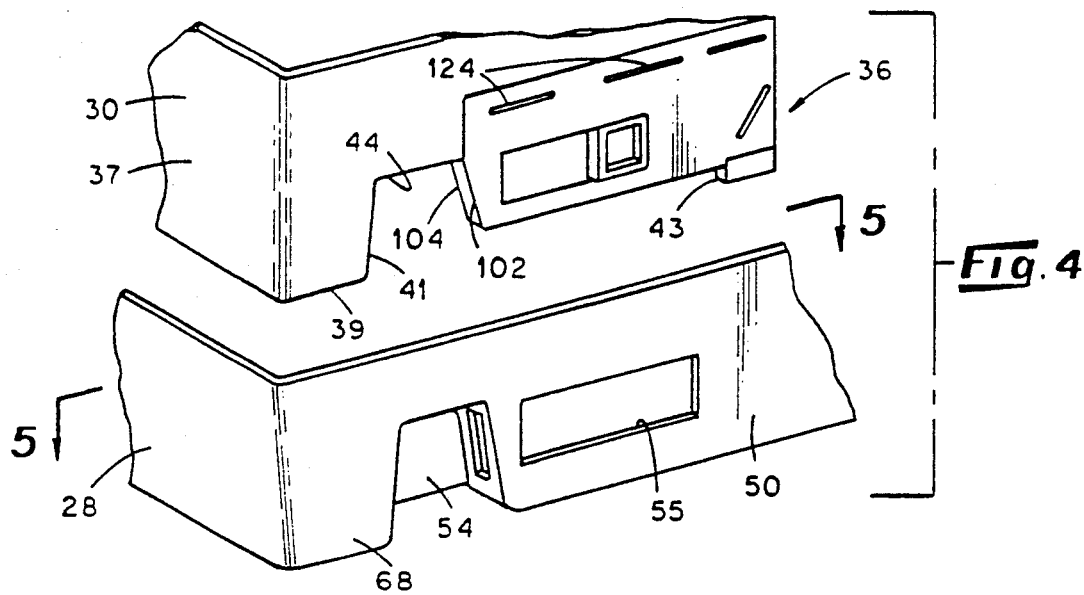
Fig.4
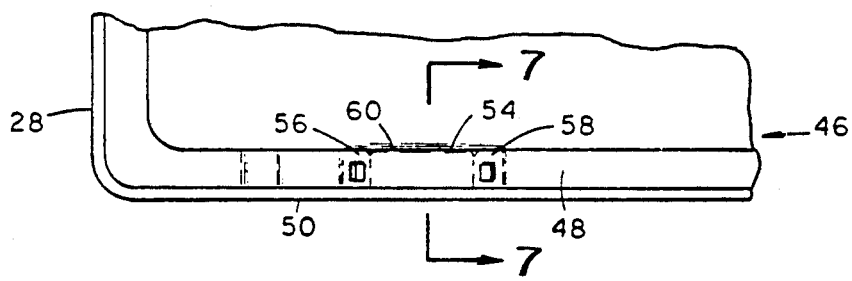
Fig.5
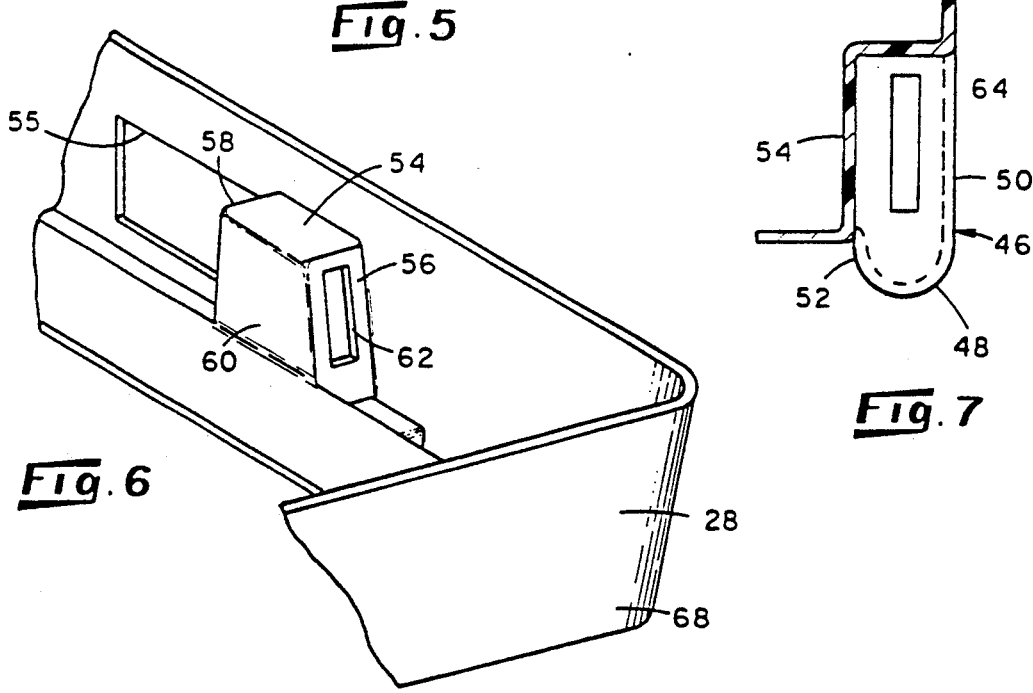
Fig.6
Fig.7

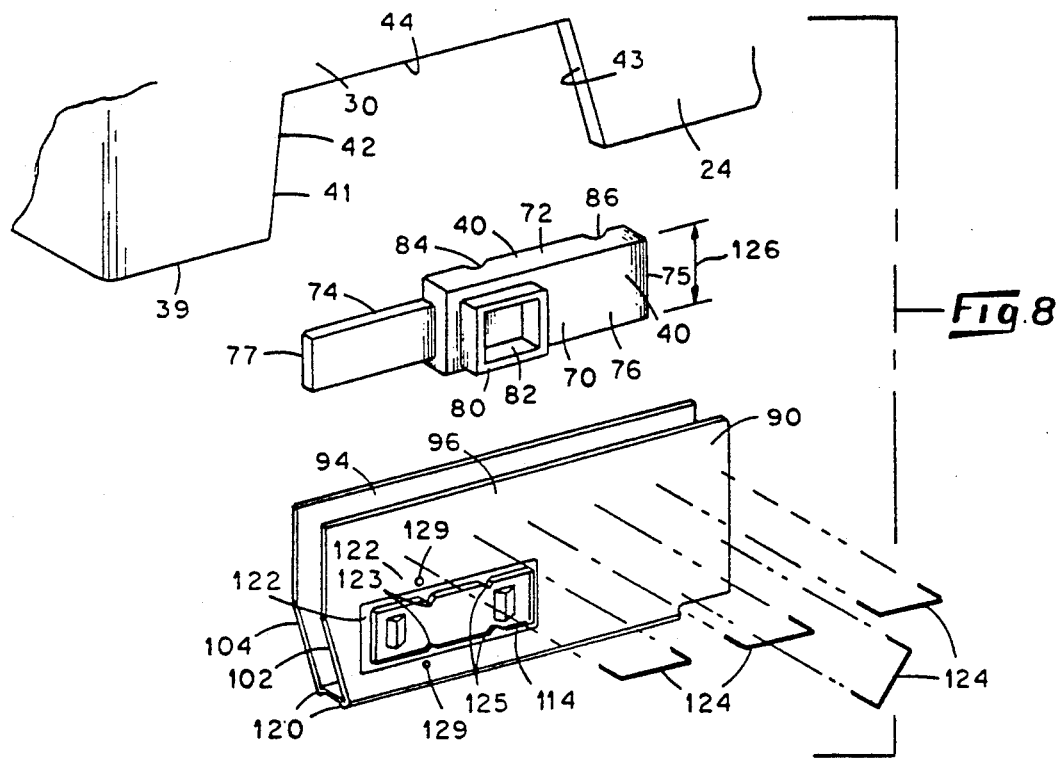
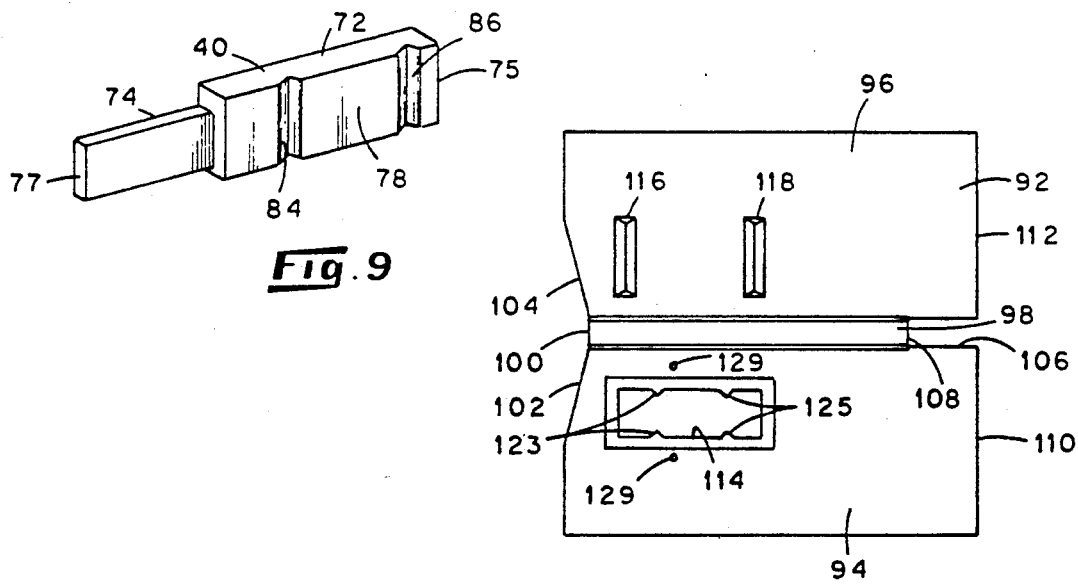

END CAP LOCKING MEANS FOR A PALLETIZED CONTAINER

FIELD OF THE INVENTION

This invention relates generally to palletized containers having top and bottom end caps and a wall member extending between the top and bottom end caps. More particularly, the present invention is concerned with means for locking the end caps to the wall member of the palletized container so that the end caps remain securely locked to the wall member during shipment, storage, or movement with a forklift truck, and is readily accessible for unlocking the end caps from the wall member.

BACKGROUND OF THE INVENTION

Shipping containers including end caps and a wall member extending between the end caps are well known in the art. Commonly, the end caps of such containers are provided with means for receiving the forks of a forklift truck for facilitating the lifting and transporting of the containers. Preferably, these shipping containers, or palletized containers, are relatively low in cost and are able to adequately protect the products contained therein from shipping and/or handling damage.

Limitations associated with palletized containers of the prior art relate to the security of the locked relationship of the end cap and wall member, to the ease of accessibility to the locking means for locking or unlocking the end cap to the wall member and to the protection of the locking means during storage and transit. Locking means of a prior art container, for example, may be inadvertently actuated from a locked condition to an unlocked condition as a result of vibrational or stress-related forces to which the locking means may be exposed during lifting or transport of the container. Moreover, such locking means may be positioned about the container so that access to the locking means for purposes of locking or unlocking the end cap from the wall member is difficult. Still further, the means by which the end cap is locked to the wall member may be exposed in such a manner that the locking means could be damaged when containers of like construction are stacked next to one another or when moved into or out of a storage location or a shipping vehicle. Yet still further, some of the end cap locking means of prior art containers include a component that must be destroyed in order that the end cap be removed, and are thus not reusable.

It is an object of the present invention to provide a palletized container having a sidewall-defining member and an end cap for attachment to the sidewall-defining member and improved means for locking the end cap to the sidewall-defining member.

Another object of the present invention is to provide such a container having end cap locking means which resists inadvertent actuation from a locked condition to an unlocked condition.

Still another object of the present invention is to provide such a container having locking means for the end cap which is easily accessible from one side of the container.

Yet another object of the present invention is to provide such a container having locking means for the end cap which is not susceptible to damage as the container is stacked or moved from one location to another.

A further object of the present invention is to provide such a container having improved means for locking the end cap to or unlocking the end cap from the sidewall-defining member of the container without the need for tools and which does not involve a component that must be destroyed in order for the end cap to be removed from the sidewall-defining member.

SUMMARY OF THE INVENTION

This invention is embodied in a palletized container including means defining sidewalls for the container and an end cap for attachment to the sidewall-defining means. The sidewall-defining means has two opposite ends and a planar portion adjacent one end of the opposite ends, and the one end cap is adapted to accept the one end of the sidewall-defining means when placed in position for attachment thereto.

The improvement is characterized by locking means for locking the sidewall-defining means to the end cap including a slide member and retaining means for slidably mounting the slide member on the one end of the sidewall-defining means so that the slide member can be moved in a direction generally parallel to the plane of the planar portion of the sidewall-defining means between a retracted position and an advanced position. Means are associated with the end cap defining an opening for receiving a part of the slide member when the slide member is moved from its retracted position toward its advanced position to thereby lock the sidewall-defining means to the end cap.

BRIEF DESCRIPTION OF THE DRAWINGS

FIG. 4 is a perspective view of a fragment of the FIG. 1 container shown with one of its end caps removed from its sidewall-defining member.

FIG. 5 is a plan view of the end cap fragment of FIG. 4 as seen along line 5—5 of FIG. 4.

FIG. 6 is a perspective view of the end cap fragment of FIG. 4, shown from an alternative angle.

FIG. 7 is a cross-sectional view taken along line 7—7 of FIG. 5.

FIG. 8 is a perspective view of the sidewall-defining member fragment of FIG. 4, shown before the slide bar and slide bar retainer are attached thereto.

FIG. 9 is a perspective view of the slide bar illustrated in FIG. 8, shown from an alternative angle.

FIG. 10 is a plan view of the slide bar retainer of the FIG. 8 view, shown before it is folded into the configuration illustrated in FIG. 8.

DETAILED DESCRIPTION OF THE ILLUSTRATED EMBODIMENT

Figure 1:
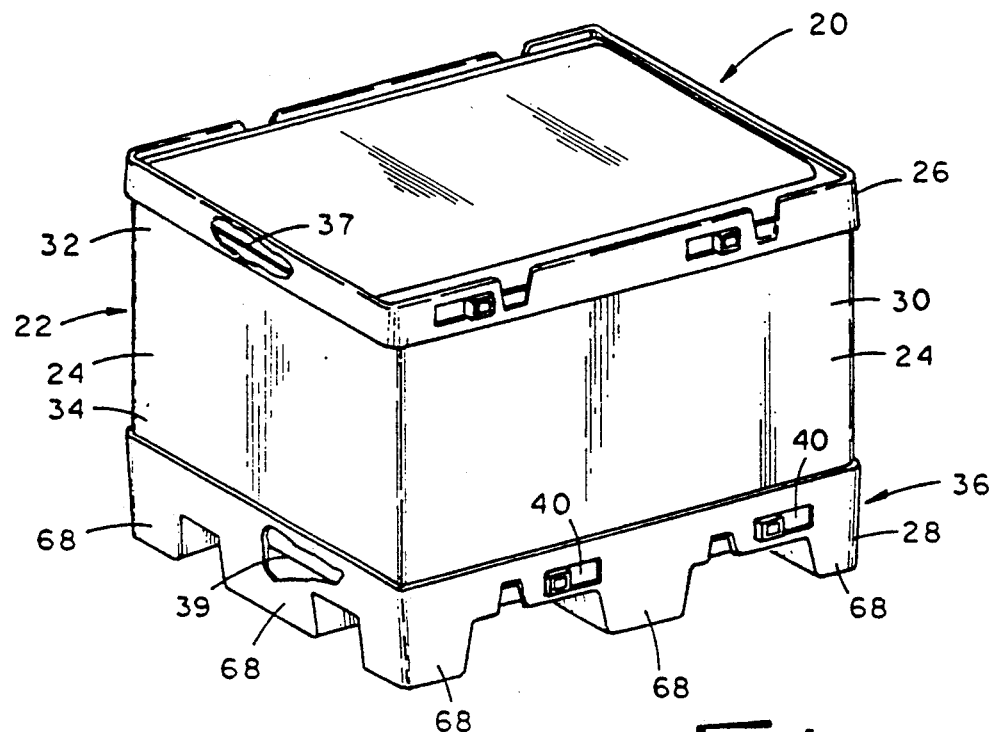
FIG. 1 is a perspective view of one embodiment of palletized container incorporating features of the present invention and shown partially cut-away.

Turning now to the drawings in greater detail and considering first FIG. 1, there is shown a palletized container, generally indicated 20, within which features of the present invention are incorporated. The container 20 includes means 22 defining four sidewalls 24 (only two shown in FIG. 1) for the container 20 and two end caps 26, 28 locked to the sidewall-defining means 22. Each of the container sidewalls 24, constructed, for example, of cardboard, and in the depicted container 20 is joined along its side edges to adjacent sidewalls so that all four of the sidewalls 24 are held together as a single unit and so that the joined sidewalls 24 form a tubular member 30 having top and bottom ends 32 and 34 which open upwardly and downwardly, respectively. Each of the end caps 26 or 28 is appropriately fitted about a corresponding end 32 or 34 of the tubular member 30 for closing the end 32 or 34. The container 20 also includes locking means, generally indicated 36, including eight slide members or bars 40 for releasably locking the end caps 26, 28 in the end-closing condition upon the tubular member 30.

Figure 2:
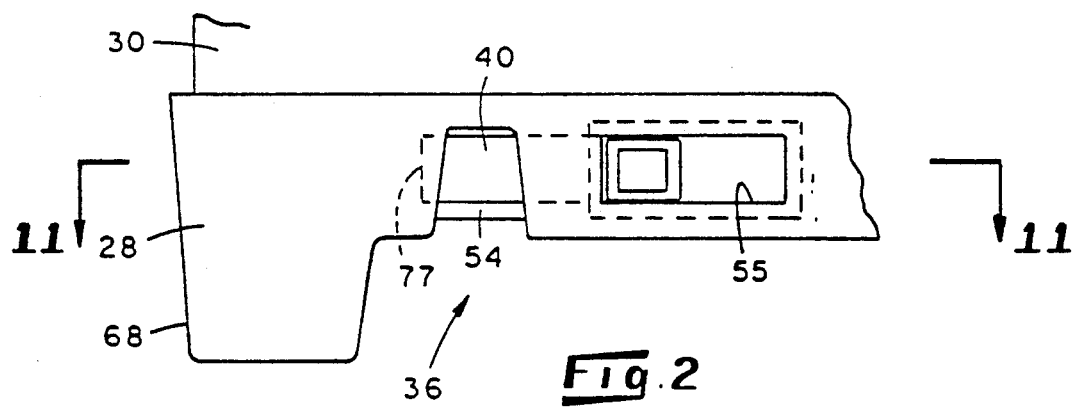
FIG. 2 is a side elevational view of a fragment of the FIG. 1 container illustrating the slide bar of the container when in its advanced, or locked, position.
Figure 3:
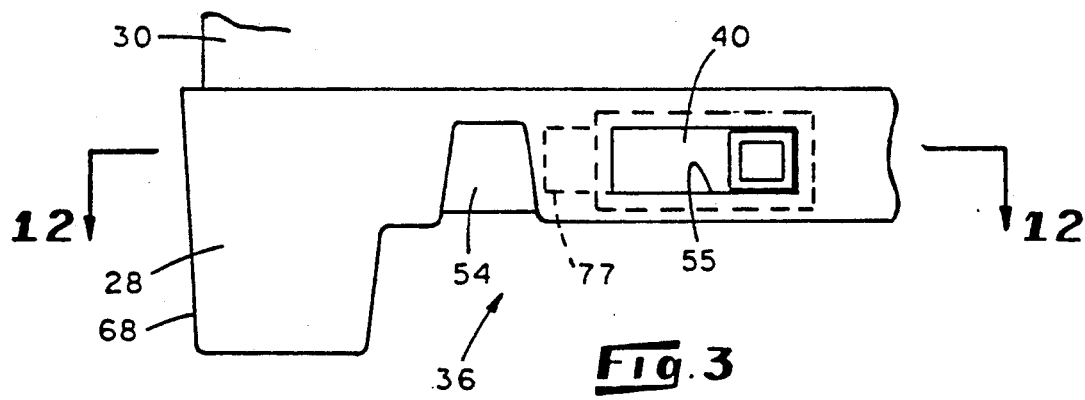
FIG. 3 is a view similar to that of FIG. 2 illustrating the slide bar of the container when in its retracted, or unlocked, position.

As exemplified by the slide bar 40 of FIGS. 2-4, each slide bar 40 is slidably movable relative to the tubular member 30 between an advanced position, as illustrated in FIG. 2, and a retracted position, as illustrated in FIG. 3. As will be described in greater detail herein, each end cap 26 or 28 cooperates with the slide bar 40 when the slide bar is in its advanced position to lock the end cap 26 or 28 to the tubular section 30. Conversely, when each slide bar 40 is in its retracted position, the end caps 26, 28 are unlocked from the tubular member 30.

With reference again to FIG. 1, the open top 32 of the sidewall-defining means 22 is bordered by a top edge 38, and the open bottom 34 of the sidewall-defining means 22 is bordered by a bottom edge 39. Provided along the top and bottom edges 38, 39 is a plurality of notches 41 (FIGS. 4 and 8) within which the slide bars 40 are positioned. Although the top and bottom edges 38, 39 may include any of a number of notches 41, the top edge 38 of the depicted embodiment includes four upwardly-opening notches, two of which are positioned in each of two opposing sidewalls 24, and the bottom edge 39 includes four downwardly-opening notches, two of which are positioned in each of two opposing sidewalls 24.

As exemplified by the notch 41 in FIG. 8, each notch provided along the top and bottom edges 38, 39 includes two opposite sides 42, 43 and a bottom 44. The bottom 44 is oriented generally parallel to the remainder of the corresponding edge 38 or 39, and the side edges 42, 43 slightly diverge away from one another as a path is traced along the side edges 42, 43 from the bottom 44.

Each end cap 26 or 28 is of a shape suitable to be positioned across a corresponding end 32 or 34 of the tubular member 30 for closing the end 32 or 34. In this connection and with reference to FIGS. 5-7, each end cap 26 or 28 includes means, generally indicated 46, defining a groove 48 extending along the periphery of the end cap 26 or 28 for receiving the edge 38 or 39 of a corresponding one of the top and bottom ends 32 and 34 of the tubular member 30 when the corresponding top or bottom end 32 or 34 is closed by the end cap 26 or 28. Each end cap 26 or 28 is constructed of a rigid material, such as a hard plastic, suitable for re-use. The bottom of the cap 28 also includes a plurality of spaced feet 68 adapted to engage the ground or other underlying support surface and between which the forks of a forklift truck may be inserted for purposes of lifting and transporting the container 20. When constructed of plastic, each end cap 26 or 28 may be formed as a unitary body in a molding process.

As best seen in FIG. 7, the groove-defining means 46 is generally U-shaped in cross section so that the legs of the "U" provide opposite walls 50 and 52 of the groove 48. The outermost wall 50 is of a greater height dimension than the wall 52 and extends a substantial distance in overlying relationship with the wall 24 of the sidewall member 30 when the ends 32, 34 are closed by the end caps 26, 28. Within this outermost wall 50 is provided a boss 54 protruding inwardly of the end cap and a substantially rectangular opening 55 disposed to one side of each boss 54. In each depicted end cap 26 or 28, the boss 54 is provided by an indentation providing two opposite sides 56, 58 which project inwardly of the wall 50 so as to intersect the centerline of the groove 48 and a vertical side 60 joining the opposite sides 56 and 58. The opposite sides 56, 58 of the boss 54 include aligned openings or slots 62 and 64 for receiving a part of the slide bar 40 (FIGS. 2 and 3) when the slide bar 40 is moved out of its retracted position and toward its advanced position. As best shown in FIG. 6, the vertical side 60 is slightly tapered in shape as a path is traced upwardly along the side 60.

With reference to FIGS. 8 and 9, each slide bar 40 includes an elongated body 70 molded, for example, out of a rigid plastic and having two opposite end portions 72 and 74 providing opposite ends 75 and 77, respectively, of the body 70. Although the slide bar 40 may take any of a number of forms, one end portion 72 of the depicted slide bar 40 has a form which resembles a rectangular prism having a rectangular front surface 76 and a rectangular back surface 78. Provided within the front surface 76 is a raised neck region 80 positioned about a substantially square recess 82. As will be apparent herein, the recess 82 is adapted to accept an operator's finger or an appropriate tool inserted therein for manually shifting the slide bar 40 between its retracted and advanced positions. Provided along the back surface 78, as best shown in FIG. 9, is a pair of linear, spaced grooves 84, 86 of V-shaped cross section which extend generally transversely thereacross with respect to the longitudinal axis of the slide bar 40 and whose purpose will be apparent herein. The other end portion 74 of the slide bar body 70 is substantially rectangular in cross section yet reduced in size in comparison to that of the end portion 72 for receipt by the slots 62 and 64 provided in the end cap boss 54 when inserted endwise therethrough. If desired, the end portion 72 may be formed with longitudinally-extending ribs to enhance the strength of the end portion 72.

As mentioned earlier and with reference still to FIG. 8, each slide bar 40 is positioned within a corresponding notch 41 provided along the edges 38, 39 of the tubular member 30 for sliding movement between the opposite sides 42, 43 of the notch 41. To this end, the container 20 includes retaining means in the form of a grommet or retainer 90 for securing the slide bar 40 to the tubular member 30 in a manner which permits the slide bar 40 to be slidably moved between its retracted and advanced positions. In the depicted embodiment 20, the retainer 90 includes a thin, resilient sheet 92 (FIG. 10) of material, e.g., plastic, which has been cut, stamped and folded into its U-shaped configuration illustrated in FIG. 8. In particular, the sheet 92 is cut to the general shape illustrated in FIG. 10 so as to provide two half sections 94, 96 and a mid-section 98 disposed between the half-sections 94, 96. Along one end of the sheet mid-section 98 is a straight edge 100, and along one end of the sheet half-sections 94, 96 are tapered edges 102, 104 joined to the edge 100 at opposite ends thereof. Along the other end of the sheet 92 is a notch 106 having a bottom 108 disposed opposite the mid-section edge 100 and a pair of linear edges 110, 112 disposed on opposite sides of the notch 106.

Figure 11:
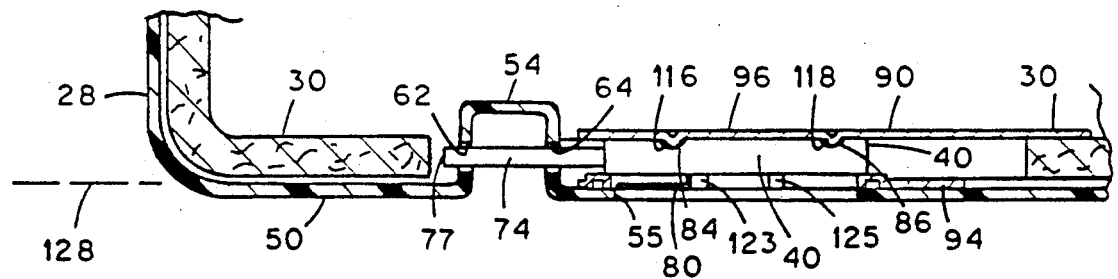
FIG. 11 is a cross-sectional view taken about along line 11—11 of FIG. 2.

The sheet 92 is then stamped to form a substantially rectangular opening 114 in one half-section 94 and a pair of detents 116, 118 in the other half-section 96. The rectangular opening 114 is sized to accept the neck region 80 of the slide bar 40 and permit the neck region 80 to be slidably moved therealong as the slide bar 40 is moved between its advanced and retracted positions. The detents 116, 118 are shaped so that when the sheet 92 is formed into the configuration of FIG. 8, the detents 116, 118 are directed inwardly of the configuration. When the retainer 90 is thereafter attached to the tubular member 30 about the slide bar 40 in a manner described herein and the slide bar 40 is positioned in its advanced position as shown in FIG. 11, the detents 116, 118 are accepted by the grooves 84, 86 provided in the back surface 78 of the slide bar 40. Accordingly, the detents 116, 118 are appropriately sized in relation to the grooves 84, 86 and spaced from one another for receipt by the grooves 84, 86 when the slide bar 40 is positioned in the FIG. 11 advanced position. The detent 118 is appropriately positioned for receipt by the groove 84 when the slide bar 40 is positioned in the FIG. 12 retracted position. If desired, the rigidity of the sheet 92 may be enhanced by the provision of reinforcing ribs 120 provided along the edge of the mid-section 98 as shown in FIG. 8.

Figure 12:
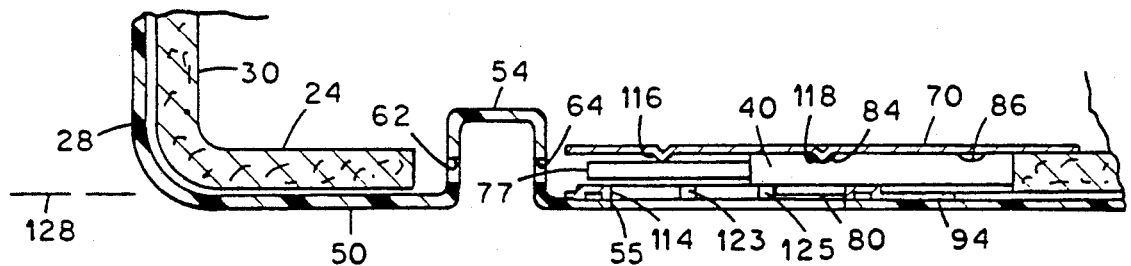
FIG. 12 is a cross-sectional view taken about along line 12—12 of FIG. 3.

In the depicted retainer 90, the rectangular opening 114 is bounded by an inwardly-directed neck region 122 as shown in FIGS. 8 and 10, and the neck region 122 is provided with two opposing pairs 123, 125 of protuberances as best shown in FIG. 10. When the slide bar 40 is positioned in its advanced position as shown in FIG. 11, the slide bar neck region 80 is positioned to one side of, i.e., to the left as viewed in FIG. 11 of the protuberance pair 123, and when the slide bar 40 is positioned in its retracted position as shown in FIG. 12, the slide bar neck region 80 is positioned to one side of, i.e., to the right as viewed in FIG. 12 of the protuberance pair 125. As is apparent herein, the cooperation between the protuberance pairs 123, 125 and the slide bar neck region 8 aid in maintaining the slide bar 40 in its advanced and retracted positions. Accordingly, the protuberances 123, 125 are appropriately sized in relation to the slide bar neck region 80 so that when the slide bar 40 is positioned in its advanced, or FIG. 11, position, the slide bar neck region 80 is captured between the left end of the opening 114 and the protuberances 123 and when the slide bar 40 is positioned in its retracted, or FIG. 12, position, the slide bar neck region 80 is captured between the right end of the opening 114 and the protuberances 125. Although the distance between the protuberances 123 and 123 and the distance between protuberances 125 and 125 are each slightly smaller than the height of the neck region 80 as viewed in FIG. 8, the slide bar 40 may be forcibly moved along the length of the retainer opening 114 between its advanced and retracted positions as the retainer material permits the protuberances 123 and 125 to flex outwardly as the slide bar neck region 80 is urged therebetween and return to an inward, i.e., unflexed position after the slide bar has cleared the protuberances 123, 125.

After forming the sheet 92 into the shape of FIG. 10, the sheet 92 is folded into the U-shaped configuration illustrated in FIG. 8 to provide the retainer 90, and the slide bar 40 is positioned within the "U" of the retaining means 90 so that the raised neck region 80 of the slide bar 40 is accessible through the retainer opening 114. The retainer 90, with the slide bar 40 positioned therein, is then positioned at least partially within a notch 41 of the tubular member 30 so that the retainer half-sections 94, 96 are positioned on opposite sides of the corresponding sidewall 24 and so that the retainer mid-section 98 is positioned in abutting relationship with the notch edge 43. It follows that the provision of the notch edge 43 for abutting the mid-section edge 108 facilitates the placement of the retainer 90 in its desired position about the sidewall 24. With the retainer 90 held in the aforedescribed position about the sidewall 24, staples 124 (FIG. 8) are directed through the retainer half-sections 94, 96 to secure the retainer 90 to the sidewall 24. The retainer 90 captures, and thereby retains, the slide bar 40 within the notch 41 yet permits the slide bar 40 to be manually moved lengthwise between the notch sides 42, 43 as the raised neck region 122 is manually guided back and forth by an operator's finger or appropriate tool. Accordingly, the slide bar height, indicated 126 in FIG. 8, is slightly smaller than the depth of the notch 41 as measured between the notch bottom 44 and the location along the notch edge 41 at which the mid-section edge 108 abuts the edge 41.

The retainer 90, with its resilient sheet-like sections 94, 96, is sized in relation to the thickness of the slide bar 40 so that when positioned about the slide bar 40, the slide bar 40 is snugly received, or slightly squeezed, between the half-sections 94, 96 of the retainer 90. More specifically, the distance between the detents 116, 118 of the half-section 96 and the neck region 122 of the opposing half-section 94 is slightly smaller than the thickness of the end portion 72 of the slide bar 40 so that movement of the slide bar 40 between its advanced position as shown in FIG. 11 and its retracted position as shown in FIG. 12 requires that an appropriately-directed force above a minimum amount be exerted upon the slide bar 40. Thus, the snug-fitting relationship between the slide bar 40 and the retainer 90 helps to maintain the slide bar 90 in position when in either of its advanced or retracted positions.

As the slide bar 40 is moved between its FIG. 11 (or FIG. 2) advanced position and its FIG. 12 (or FIG. 3) retracted position, the back surface 78 of the slide bar 40 slides along the detents 116, 118 of the retainer 90. When the slide bar 40 reaches either of its advanced or retracted positions, the memory or resiliency of the retainer half-sections 94, 96 urge at least one of the detents 116, 118 into a corresponding groove 84 or 86 of the slide bar 40. More specifically and when the slide bar 40 is positioned in its FIG. 11 advanced position, both detents 116, 118 are received by the grooves 84, 86, and when the slide bar 40 is positioned in its FIG. 12 retracted position, one detent 118 is received by one groove 84. Forced movement of the slide bar 40 out of its advanced or retracted position urges the half-sections 94, 96 apart as the detents 116, 118 and slide bar 40 act as cam and cam follower. It follows that the cooperation between the detents 116, 118 and the slide bar grooves 84, 86 helps to further maintain the slide bar 40 in either of its advanced or retracted position.

To position an end cap 26 or 28 over a corresponding end of the tubular member 30, the slide bars 40 associated with the corresponding end are placed in their retracted positions, and the end cap 26 or 28 is then guided onto the corresponding end. For example and with reference again to FIG. 4, by guiding the end cap 28 onto the tubular member 30, the tubular member edge 39 is directed into the end cap groove 48 (FIG. 7) and the spacing provided between the notch side 42 (FIG. 4) and the forward edges 102, 104 of the retainer 90 accept the boss 54 provided within the end cap wall 50. Accordingly, the spacing provided between the notch side 42 and the retainer forward edges 102, 104 is appropriately sized to receive the boss 54 when directed thereover.

Each slide bar 40 is positioned in such a relation with the corresponding boss 54 and end cap opening 55 when the tubular member end is closed by the corresponding end cap that the slide bar end 77 is aligned with the slots 62, 64 of the boss 54 and the raised neck region 80 of the slide bar 40 is accessible through the end cap opening 55 as illustrated in FIGS. 2 and 3. To this end, the disposition of each slide bar 40 relative to the slots 62, 64 provided in the corresponding boss 54 and the disposition of the raised neck region 80 relative to the end cap opening 55 has been predetermined accordingly. With the slide bar end 7 aligned with the boss slots 62, 64, the slide bar 40 may be manually moved from its FIG. 3 retracted position to its FIG. 2 advanced position so that the slide bar end portion 77 extends through the boss slots 62, 64 (FIG. 5) to thereby lock the end cap to the tubular member 30. To unlock the tubular member 30 from the end cap and thereby permit the tubular member 30 and end cap to be separated from one another, the slide bar 40 is manually returned from its FIG. 2 advanced position to its FIG. 3 retracted position.

It has been found that when the slide bar 40 is positioned in its FIG. 2 advanced position, the slide bar 40 is not likely to be inadvertently moved to its FIG. 3 retracted position to unlock the end cap from the tubular member 30. For example, vibrational or other forces which the container 20 may experience during shipping or transport will not normally shift the slide bar 40 out of its locked position. As discussed earlier, the receipt of both detents 116, 118 provided in the retainer 90 by the slide bar grooves 84, 86 and the provision of the opposing pair of protuberances 123 in the neck region 122 of the rectangular opening 114 help to maintain the slide bar 40 in its locked position, and the cooperation between the detents 116, 118 and grooves 84, 86 and the cooperation between the protuberances 123 and slide bar neck region 80 are advantageous in this respect. If desired, however, holes 129 may be formed in the retainer 90 adjacent the protuberances 123 as shown in FIGS. 8 and 10 through which a wire or similar cord may be looped to prevent the slide bar 40 from shifting out of its locked position unless the wire or cord is removed from the holes 129.

Another advantage provided by the locking means 36 of the container 20 relates to the fact that no portion of a slide bar 40 extends outwardly beyond the outer plane, indicated 128 in FIGS. 11 and 12, of the outermost wall 50 of the corresponding end cap when the end cap is positioned upon the tubular member 30. Therefore, the slide bars 40 are protected from damage by forklift trucks or containers of like construction stacked next to the container 20 or when moved into or out of a storage location or a shipping vehicle. Still further, the slide bars 40 are thereby prevented from impeding the placement or fit-up of the sidewall-defining means into the groove of an end cap. The locking means 36 provides an additional advantage in that each slide bar 40 may be moved between its locked and unlocked positions with no need that any component of the locking means 36 be destroyed.

Still another advantage provided by the container 20 relates to the symmetry of construction of its various components 22, 26 and 28. In other words, because the opposite sides of the end caps 26, 28 are identical to one another, the opposite sides of the sidewall-defining means 24 are identical to one another and the opposite ends of the sidewall-defining means 24 are identical to one another, the sidewall-defining means 24 may be connected between the end caps 26 in an inverted condition from its condition illustrated in FIG. 1 and the end cap 26 may be connected to the upper edge of the sidewall-defining means 24 after being rotated about a vertical axis by 180 degrees.

Figure 13:
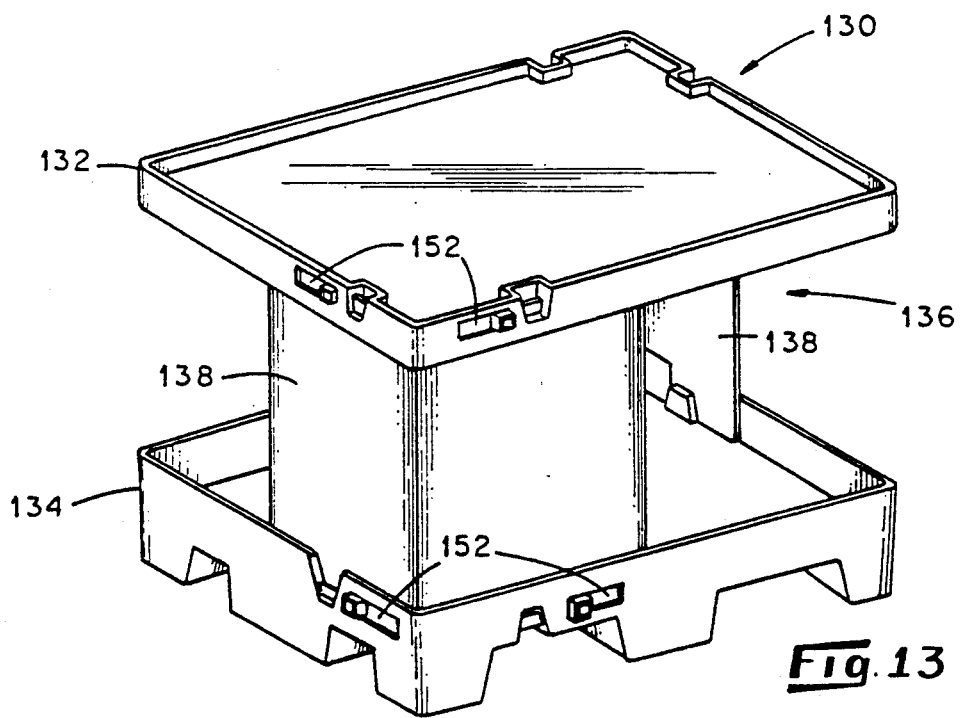
FIG. 13 is a perspective view of another embodiment of a palletized container incorporating features of the present invention.
Figure 14:
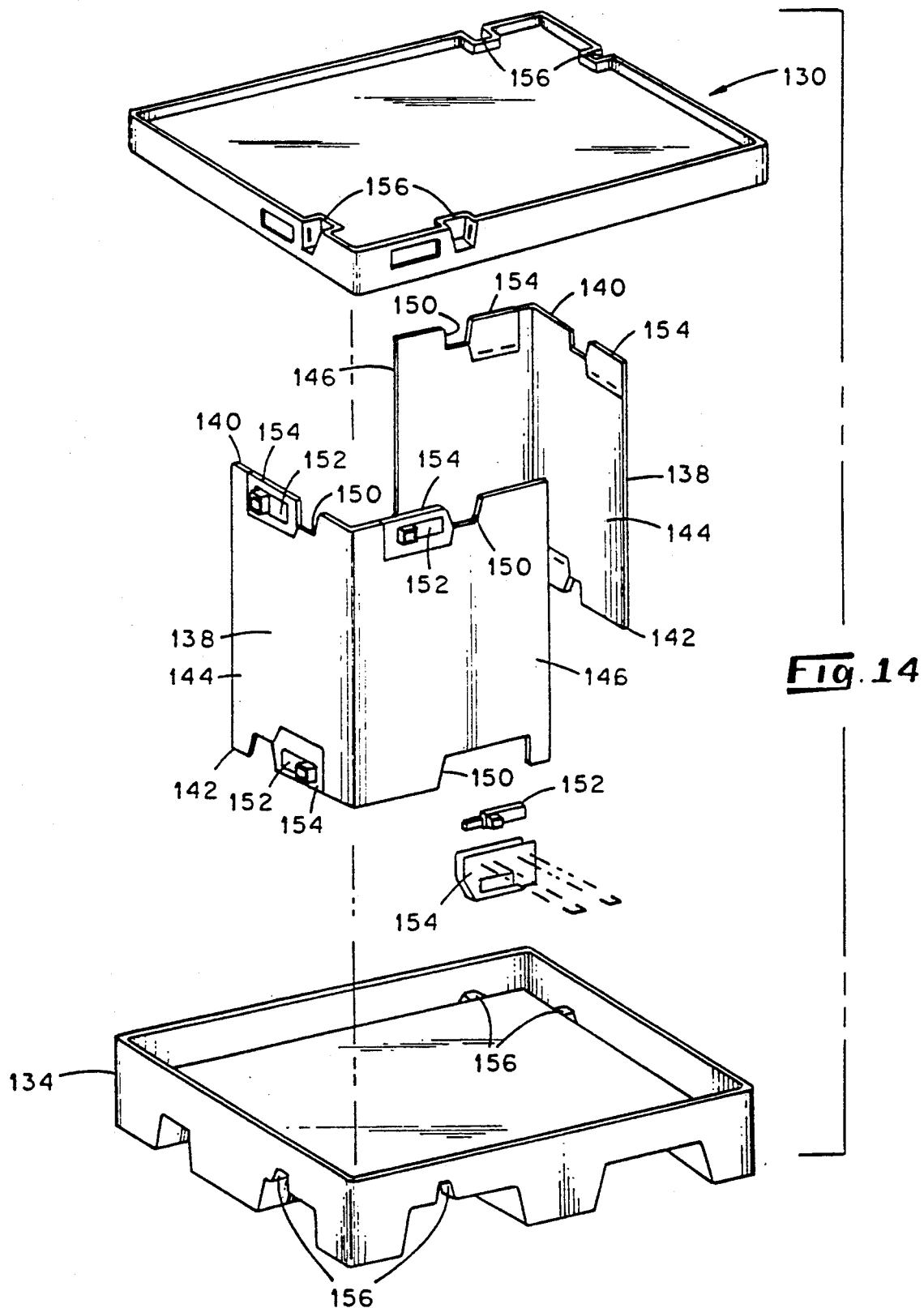
FIG. 14 is a view of the FIG. 13 container similar to that of FIG. 13, shown exploded.

It will be understood that numerous modifications and substitutions can be had to the aforedescribed embodiment without departing from the spirit of the invention. For example, although the container 20 of FIGS. 1-12 has been shown and described as including sidewall-defining means in the form of an open-ended tubular member 30, the sidewall-defining means of a container in accordance with the broader aspects of the present invention may possess any of a number of alternative forms. For example, there is illustrated in FIGS. 13 and 14 a container 130 having a pair of top and bottom end caps 132, 134, respectively, and sidewall-defining means 136 in the form of a pair of posts 128 for attachment to the end caps 132, 134 but do not enclose a space between the end caps. Each corner post 138 has two opposite ends 140, 142 which are each received by a corresponding end cap 132 or 134 and have two substantially planar wall portions 144, 146 which meet at a corner 148. Each wall portion 144 or 146 has a notch 150 adjacent each of the post ends 140, 142, and a slide member 152 is positioned within each notch 150 and slidably held therein by a retainer 154. The end caps 132, 134 each include inwardly-directed bosses 156 having slots therein for receiving part of a corresponding slide member 152 when the slide member 152 is moved to its advanced position.

Figure 15:
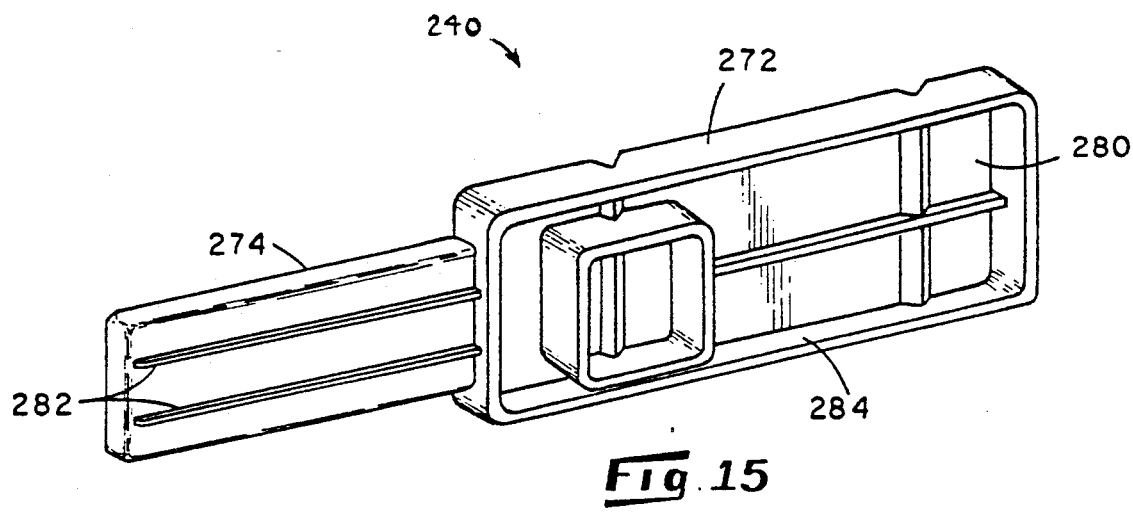
FIGS. 15 and 16 are perspective views of opposite sides of an alternative slide bar for the FIG. 1 container.
Figure 16:
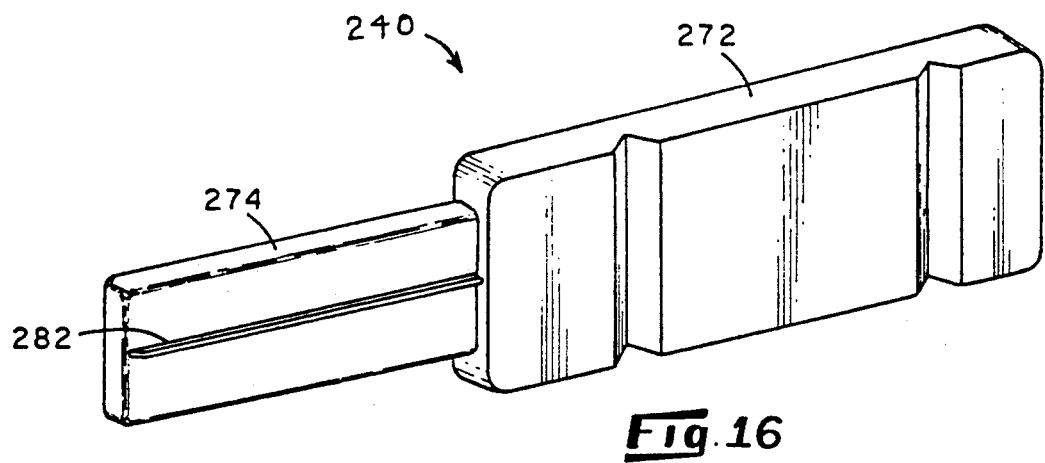

Still further, although the aforedescribed slide bar 40 has been shown and described as having two opposite end portions 72, 74 in the form of rectangular prisms, there is illustrated in FIGS. 15 and 16 an alternatively-shaped slide bar 240 suitable for use with the container 20 of FIG. 1. The slide bar 240 includes two opposite end portions 272, 274 each comprised of a body of material whose outer configuration has outer dimensions which approximate those of the slide bar 40. One end portion 272 has a side 280 which is provided with a relatively large recess 284, and the other end portion 274 is provided with strengthening ribs 282 which extend therealong. The slide bar 240 of FIGS. 15 and 16 is molded as a single component out of a suitably rigid material, such as plastic, and may be preferred over the slide bar 40 in applications in which a slide bar of lighter weight and less material is desired. Accordingly, the aforedescribed embodiment 20 is intended for the purpose of illustration and not as limitation.

I claim:

1. In a palletized container including means defining sidewalls for the container and an end cap for attachment to the sidewall-defining means, said sidewall-defining means having two opposite ends and a planar portion adjacent one end of said opposite ends, and said end cap is adapted to accept said one end of the sidewall-defining means when placed in position for attachment thereto, the improvement comprising:

locking means for locking the sidewall-defining means to the end cap including
a) a slide member;
b) retaining means for slidably mounting the slide member on said one end of said sidewall-defining means so that the slide member can be moved in a direction generally parallel to the plane of said planar portion between a retracted position and an advanced position; and
c) means associated with the end cap defining an opening for receiving a part of the slide member when the slide member is moved from its retracted position toward its advanced position to thereby lock the sidewall-defining means to the end cap.

2. The improvement of claim 1 wherein the retaining means includes means for releasably maintaining the slide member in at least one of its advanced or retracted positions.

3. The improvement of claim 1 wherein one of the slide member and the retaining means includes means defining a detent and the other of the slide member and the retaining means includes means defining a detent-accepting groove for cooperating with said detent so that as the slide member is moved into and out of one of its advanced and retracted positions, the detent and detent-accepting groove move into and out of cooperating relationship with one another for releasably securing the slide member in the one of the advanced and retracted positions.

4. The improvement of claim 1 wherein the end cap includes a outer wall positioned outside of said sidewall-defining means when placed in position for attachment thereto, the outer wall includes a first access opening therein, said retaining means includes a sheet-like sidewall attached to the sidewall-defining means so as to be positioned adjacent the outer wall when the end cap is placed in position for attachment to the sidewall-defining means, and the sheet-like sidewall includes a second access opening positionable in registry with the first access opening of the outer wall to provide access to the slide member for manual movement thereof between its advanced and retracted positions.

5. The improvement of claim 4 wherein the sheet-like sidewall has a substantially planar outer surface within which the second access opening is defined and the slide member is sized so that no substantial portion thereof protrudes through the second access opening beyond the plane of said outer surface.

6. The improvement of claim 4 wherein the slide member includes a neck portion positioned within the second access opening and the retaining means includes means defining opposing protuberances disposed on opposite sides of the second access opening for cooperating with the neck portion of the slide member for releasably securing the slide member in at least one of its advanced or retracted positions.

7. The improvement of claim 1 wherein said retaining means includes sheet-like sidewalls positioned on opposite sides of the slide member and between which the slide member is snugly retained.

8. A palletized container comprising:

means defining sidewalls for the container including at least one elongated section having one edge at one of its ends and a planar portion adjacent said one edge, said one edge having a notch therealong opening out of the corresponding section end and having two opposite sides;

an elongated slide member positioned lengthwise within the notch for lengthwise movement between the notch sides;

retaining means attached to said section adjacent the notch thereof for maintaining the slide member within the notch so that the slide member is permitted to slidably move lengthwise between the notch sides as aforesaid between an advanced position at which one end of the slide member is positioned adjacent one side of the notch and a retracted position at which the one end of the slide member is appreciably spaced from the one side of the notch and to provide a gap between the one end of the slide member and the one side of the notch when the slide member is in its retracted position; and means defining an end cap for attachment to said section and including means for receiving the one edge of said section when placed in position for attachment thereto, the receiving means including an outermost wall positionable outside of the one edge when said section is placed in position for attachment to the end cap and means providing a boss protruding generally inwardly of the outermost wall;

said boss being accepted by said gap when said section is placed in position for attachment to the end cap and including an opening for accepting the one end of the slide member when the slide member is moved from its retracted position toward its advanced position so that by moving the slide member out of its retracted position so that part of the slide member is received by the opening in the boss, said end cap is locked to said section and so that by moving the slide member into its retracted position so that the slide member is withdrawn from the opening in the boss, the end cap is unlocked from said section.

9. The container as defined in claim 8 wherein the retaining means includes means for releasably maintaining the slide member in at least one of its advanced or retracted positions.

10. The container as defined in claim 8 wherein one of the slide member and the retaining means includes means defining a detent and the other of the slide member and the retaining means includes means defining a detent-accepting groove for cooperating with said detent so that as the slide member is moved into and out of one of its advanced and retracted positions, the detent and detent-accepting groove move into and out of cooperating relationship with one another for releasably securing the slide member in the one of the advanced and retracted positions.

11. The container as defined in claim 10 wherein the retaining means includes the means defining a detent and the slide member includes the means defining a detent-accepting groove.

12. The container as defined in claim 8 wherein the outermost wall includes a first access opening therein, said retaining means includes a sheet-like sidewall attached to the tubular member so as to be positioned adjacent the outermost wall when said section is placed in position for attachment to the end cap, and the sheet-like sidewall includes a second access opening positionable in registry with the first access opening to provide access to the slide member for manual movement thereof between its advanced and retracted positions.

13. The container as defined in claim 12 wherein the sheet-like sidewall has a substantially planar outer surface within which the second access opening is defined and the slide member is sized so that no substantial portion thereof protrudes through the second access opening beyond the plane of said outer surface.

14. The container as defined in claim 13 wherein the slide member includes a neck portion positioned within the second access opening and the retaining means includes means defining opposing protuberances disposed on opposite sides of the second access opening for cooperating with the neck portion of the side member for releasably securing the slide member in at least one of its advanced or retracted positions.

15. The container as defined in claim 8 wherein said retaining means includes sheet-like sidewalls positioned on opposite sides of the slide member and between which the slide member is snugly retained.

16. The container as defined in claim 15 wherein said sheet-like sidewalls are positioned on opposite sides of said one edge and attached thereto with fasteners.

17. The container as defined in claim 16 wherein the sheet-like sidewalls define leading edges which are spaced from the one side of the notch and said gap is provided by the spacing provided between the leading edges and the one side of the notch.

18. The container as defined in claim 8 wherein the outermost wall includes an indentation having walls which protrude inwardly of the end cap and which include a pair of aligned slots, the boss is provided by walls of the indentation, and the boss opening is provided by the pair of aligned slots.

19. The container as defined in claim 8 wherein the slide member includes an elongated body having an accessible side surface, and the side surface includes means for accepting a finger of an operator for movement of the slide member with the finger between its advanced and retracted positions.

20. A sidewall system for a palletized container that includes a pair of end caps for providing the top and bottom of the container and adapted to accept the sidewall system for attachment thereto, said sidewall system comprising:

two sections of substantially rigid material having two opposite ends wherein each section extends between the end caps and along at least a portion of one side of the container, each section including a planar portion adjacent each of its ends for acceptance by a corresponding end cap and including means defining a notch in each end portion opening out of the corresponding end thereof;

slide lock means including an elongated body positioned within each notch;

means for securing each slide lock body within its corresponding notch for sliding movement between an advanced position and a retracted position so that the direction of movement of each slide lock body between its advanced and retracted position is limited to the plane of the corresponding planar portion; and means associated with each end cap defining an opening for receiving at least a portion of one slide lock body when the one slide lock body is moved toward its advanced position to thereby lock the end cap to the sidewall section.

* * * * *